W. JAMES.
Plant-Extractor.
No. 217,383. Patented July 8, 1879.
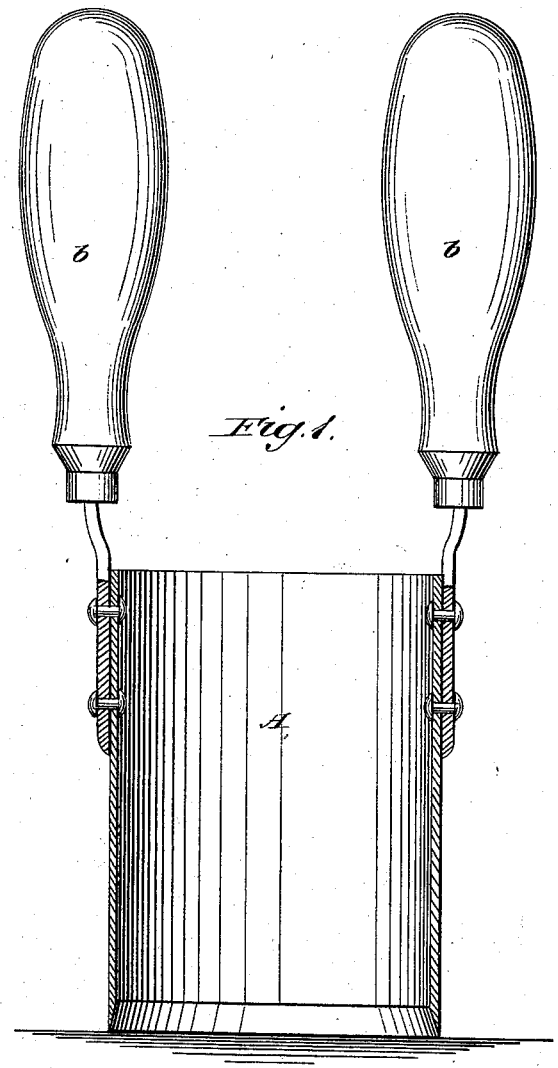
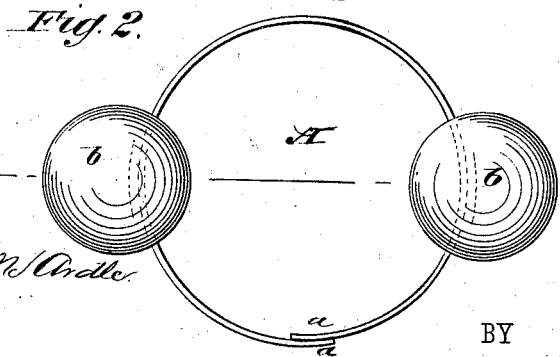

UNITED STATES PATENT OFFICE.

WILLIAM JAMES, OF JACKSONVILLE, FLORIDA.

IMPROVEMENT IN PLANT-EXTRACTORS.

Specification forming part of Letters Patent No. 217,383, dated July 8, 1879; application filed April 17, 1879.

*To all whom it may concern:*

Be it known that I, WILLIAM JAMES, of Jacksonville, in the county of Duval and State of Florida, have invented a new and Improved Plant-Extractor, of which the following is a specification.

The object of this invention is to provide an implement for extracting plants with a sufficient quantity of the surrounding soil and without injuring the roots.

It consists of a cylindrical spring with overlapping edges, sharpened on the lower edges, and having at the upper end two handles, by which it is manipulated.

The implement is operated in a manner that will be fully described farther on.

In the accompanying drawings, Figure 1 is a vertical section of the extractor on line $x\ x$ of Fig. 2, which shows a top view of the same.

Similar letters of reference indicate corresponding parts.

Referring to the drawings, the extractor consists of the hollow cylinder A, of iron or steel, with overlapping edges $a\ a$, forming thus a cylindrical spring. The lower edge of this cylinder is beveled off from the inside, so as to form a sharp edge, while at the upper edge are attached two handles, $b\ b$, opposite each other, by means of which the extractor can be easily expanded.

The manner of using the extractor is as follows: Grasp the two handles, one with each hand, with the thumbs on top and lapped edges $a\ a$ outward. Place the lower end of the cylinder over the plant, and when in contact with the earth change the position of the hands sufficiently to force the cylinder down into the soil far enough to go below all the roots. Then lift it out, the core of soil coming with it and bringing the plant. Then, when the plant is carried to the proper place, either to replant or to box for shipping, give the handles a slight twist, so as to open the cylinder, when the plant and the adhering soil will be loosened and drop out.

Owing to the closeness to the plant of the operator in using the implement, he can exercise more care and avoid injuring it or taking up gravel, &c.

I am aware that an expanding tube closed at its top and provided with a rack and lever for causing the expansion and contraction of the tube is old, and that an expansible cylinder having a slide applied to its outside for contracting it after its end has been forced into the ground is old, and these I disclaim.

I am also aware that post-hole diggers and transplanters have been made, consisting of long handles, that are pivoted upon each other, and provided with curved and sharpened plates to dig into the earth, and these I disclaim.

I am also aware that a flexible cylinder, the ends of which just meet, and which is provided with long handles and a treadle mechanism for expanding the cylinder, is old for the purpose of digging holes for posts, and this I also disclaim.

My invention differs from these in many essential points, among which are that my device, being intended only for transplanting small plants, is just sufficiently large to be readily operated by the hands without the use of the feet; the edges or ends of the cylinders overlap each other, so that the cylinder can be enlarged to a considerable extent without the danger of the ends cutting the roots as they spring together; the handles being short, the thumbs can be used in opening the cylinder.

Having thus described my invention, I claim as new and desire to secure by Letters Patent—

A plant-extractor, A, formed from a single sheet of elastic metal, that is bent into a cylindrical form, and having its edges $a$ made to overlap each other, in combination with the handles $b$, applied to opposite sides of the cylinder for both expanding the cylinder preparatory to forcing its lower edge into the ground around the plant and lifting the extractor after it has automatically compressed the earth around the plant, substantially as shown.

WILLIAM JAMES.

Witnesses:
 O. J. KEEP,
 C. F. WARRINER.